US008812485B2

(12) United States Patent  (10) Patent No.: US 8,812,485 B2
Chen et al.  (45) Date of Patent: Aug. 19, 2014

(54) DATABASE QUERY

(75) Inventors: Qi Chen, Beijing (CN); Shang Shun Lei, Beijing (CN); Yun Feng Sun, Beijing (CN); Guang Zhou Zhang, Beijing (CN); Sheng Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/597,389

(22) Filed: Aug. 29, 2012

(65) Prior Publication Data

US 2013/0054568 A1  Feb. 28, 2013

(30) Foreign Application Priority Data

Aug. 31, 2011 (CN) .......................... 2011 1 0270208

(51) Int. Cl.
*G06F 17/30* (2006.01)
(52) U.S. Cl.
USPC ............................ 707/714; 707/718; 707/719
(58) Field of Classification Search
None
See application file for complete search history.

(56) References Cited

U.S. PATENT DOCUMENTS

| 7,146,360 | B2 | 12/2006 | Allen et al. | |
|---|---|---|---|---|
| 2006/0080285 | A1* | 4/2006 | Chowdhuri | 707/3 |
| 2006/0288030 | A1* | 12/2006 | Lawrence | 707/101 |
| 2009/0254916 | A1 | 10/2009 | Bose et al. | |

OTHER PUBLICATIONS

Graefe, Goetz; "Query Evaluation Techniques for Large Databases"; Jun. 1993; ACM Computing Surveys; vol. 25, No. 2; pp. 73-77, 105-111.*
Graefe, Goetz; "Query Evaluation Techniques for Large Databases"; Jun. 1993; ACM Computing Surveys; vol. 25, No. 2; pp. 73-170.*
Jezierski et al.; "Query Execution Algorithm in Web Environment with Limited Availability of Statistics"; 2004; Computational Science—ICCS 2004, Lecture Notes in Computer Science; vol. 3036, pp. 532-536.*
Kabra et al.; "Efficient Mid-Query Re-Optimization of Sub-Optimal Query Execution Plans"; Newsletter ACM SIGMOD Record; vol. 27 Issue 2, Jun. 1998; pp. 106-117.*
Babcock et al.; "Towards a Robust Query Optimizer: A Principled and Practical Approach"; Proceedings of the 2005 ACM SIGMOD international conference on Management of data; pp. 119-130.*
Urhan et al.; "Cost Based Query Scrambling for Initial Delays"; Newsletter ACM SIGMOD Record; vol. 27 Issue 2, Jun. 1998; pp. 130-141.*
Avnur et al.; "Eddies: Continuously Adaptive Query Processing"; Newsletter ACM SIGMOD Record; vol. 29 Issue 2; Jun. 2000; pp. 261-272.*
Deshpande et al.; "Adaptive query processing"; Foundations and Trends in Databases; vol. 1 Issue 1; Jan. 2007; pp. 1-140.*
Gounaris et al.; "Adaptive Query Processing: A Survey"; Advances in Databases, Lecture Notes in Computer Science; vol. 2405; 2002; pp. 11-25.*

* cited by examiner

*Primary Examiner* — Tony Mahmoudi
*Assistant Examiner* — Umar Mian
(74) *Attorney, Agent, or Firm* — Stephen J. Walder, Jr.; Jeffrey S. Labaw

(57) ABSTRACT

Mechanisms for performing database queries are provided. With these mechanisms, in response to a query request, a query plan intended for minimum query response time and a query plan intended for minimum query total time for the query request are obtained execution of the minimum query response time query plan and the minimum query total time query plan is started. Before the execution of the minimum query total time query plan reaches a specified point, an initial query result obtained from the execution of the minimum query response time query plan is output. In response to the execution of the minimum query total time query plan reaching the specified point, continuing the execution of the minimum query total time query plan to output remaining query results.

20 Claims, 5 Drawing Sheets

Obtain a query plan intended for minimum query response time and a query plan intended for minimum query total time for the query request (S401)

Start execution of the query plan intended for the minimum query response time and execution of the query plan intended for the minimum query total time (S402)

Before the execution of the query plan intended for the minimum query total time reaches a specified point, output an initial query result obtained from the execution of the query plan intended for the minimum query response time (S403)

In response to the execution of the query plan intended for the minimum query total time reaching the specified point, continue the execution of the query plan intended for the minimum query total time to output remaining query results (S404)

Fig.4

DATABASE QUERY

BACKGROUND

Embodiments of the present invention generally relate to a database management system, and more specifically, to a method and system for database query.

A database is a warehouse for organizing, storing and managing data according to a structure of the data. A relational database is a currently common type of database where data in a relational database are currently queried using the Structured Query Language (SQL) whose functions include query, manipulation, definition, and control. SQL is a comprehensive, general-purpose relational database language and also a highly non-procedural language. That is, SQL only requires users to indicate what to do, without indicating how to do the operation. SQL integrates all operations during a database lifecycle. Moreover, SQL provides methods of interacting with a relational database and can co-work with standard programming languages.

A database management system (referred as "DBMS" for short) is a large software suite for establishing, using, manipulating and managing databases. A database management system manages and controls databases in a unified manner, so as to ensure safety and integrity of databases. Existing relational database management systems include SQL Server, Sybase, Informix, Oracle, DB2 available from International Business Machines (IBM) Corporation, etc. All query engines (also known as Query Execution Runtime) of a database management system support the query function using SQL. A user or an application may use SQL to query a managed database by a query engine of a database management system. A result of the query usually includes a plurality of records. The time elapsed before the first item of data conforming to the query condition is returned is usually referred to as the query response time, and the time elapsed before a set of all data results conforming to the query condition is returned is referred to as a query total time.

Upon receipt of a query request, as far as possible, a current database management system may use minimum total time for query by default, and will generate a query access plan that can return complete query results in the most efficient way to the user or the application issuing the query. Sometimes, the user or application issuing the query tends to obtain the first several query results as soon as possible, without caring about the time elapsing during the entire query. Such an application may use the statement "OPTIMIZED FOR FIRST N ROW" to notify a query engine optimizer of the database management system to execute the query in minimum query response time instead of minimum query total time.

However, many applications need to execute a query in both minimum query response time and minimum query total time. For example, when an application issuing a query makes a query request, the application may need to obtain a response from a database as soon as possible and then obtain several initial query results so that the application can judge whether or not to execute a subsequent query or other business logics. Current database management systems can only provide query plans in minimum query response time or provide query plans in minimum query total time, whereas none of these query plans can reduce both the query response time and the query total time.

SUMMARY

There is a need for a novel method of database query, which method makes it possible for a user or an application, while querying a database, to execute the query with both minimum query response time and minimum query total time, so as to satisfy the user's or the application's requirements on database query.

According to an aspect of the present invention, there is provided a method of database query. The method comprises, in response to a query request, obtaining a query plan intended for minimum query response time and a query plan intended for minimum query total time for the query request. The method further comprises starting execution of the query plan intended for minimum query response time and execution of the query plan intended for minimum query total time. Moreover, the method comprises outputting, before the execution of the query plan intended for minimum query total time reaches a specified point, an initial query result obtained from the execution of the query plan intended for minimum query response time. Furthermore, the method comprises, in response to the execution of the query plan intended for minimum query total time reaching the specified point, continuing the execution of the query plan intended for minimum query total time to output remaining query results.

According to another aspect of the present invention, there is provided a system for database query. The system comprises a processor and a memory coupled to the processor, the memory comprising instructions that when executed by the processor cause the processor to obtain, in response to a query request, a query plan intended for minimum query response time and a query plan intended for minimum query total time for the query request. The instructions further cause the processor to execute the query plan intended for minimum query response time and the query plan intended for minimum query total time. Moreover the instructions cause the processor to detect whether the execution of the query plan intended for minimum query total time reaches a specified point. In addition, the instructions cause the processor to output query results. Before detecting that the execution of the query plan intended for minimum query total time reaches the specified point, an initial query result obtained from the execution of the query plan intended for minimum query response time is output. In response to detecting that the execution of the query plan intended for minimum query total time reaches the specified point, the processor continues the execution of the query plan intended for minimum query total time to cause the remaining query results to be output.

BRIEF DESCRIPTION OF THE SEVERAL VIEWS OF THE DRAWINGS

The above and other objectives, features, and advantages of the present invention will become more apparent from the more detailed description of exemplary embodiments of the present invention, when taken in conjunction with the accompanying drawings wherein like numerals usually denote the same components in the exemplary embodiments of the present invention.

FIG. 4 shows steps of a novel method of database query according to the present invention.

DETAILED DESCRIPTION

Illustrative embodiments of the present invention will be described in more detail with reference to the figures that illustrate these illustrative embodiments. However, the present invention may be implemented in various forms and should not be construed as being limited to embodiments described here. On the contrary, these embodiments are provided in order to make the present invention more thorough and complete and to fully convey the scope of the present invention to those skilled in the art.

Figure 1:
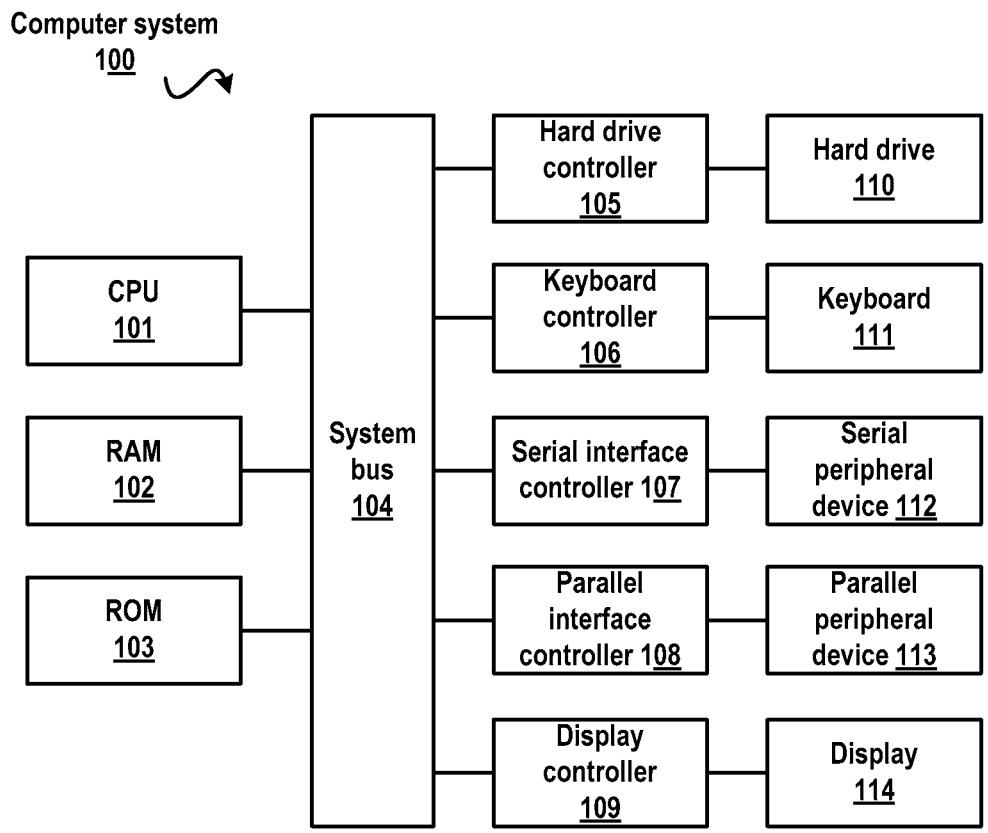
FIG. 1 shows an exemplary computer system 100 which is suitable for implementing embodiments of the present invention.

FIG. 1 shows an exemplary computer system 100 which is suitable for implementing illustrative embodiments of the present invention. As shown in FIG. 1, the computer system 100 may include: CPU (Central Process Unit) 101, RAM (Random Access Memory) 102, ROM (Read Only Memory) 103, a system bus 104, a hard drive controller 105, a keyboard controller 106, a serial interface controller 107, a parallel interface controller 108, a display controller 109, a hard drive 110, a keyboard 111, serial peripheral device 112, parallel peripheral device 113 and a display 114. Among the above devices, the CPU 101, RAM 102, ROM 103, hard drive controller 105, keyboard controller 106, serial interface controller 107, parallel interface controller 108 and display controller 109 are coupled to the system bus 104. The hard drive 110 is coupled to the hard drive controller 105. The keyboard 111 is coupled to the keyboard controller 106. The serial peripheral equipment 112 is coupled to the serial interface controller 107. The parallel peripheral Equipment 113 is coupled to the parallel interface controller 108. Moreover, the display 114 is coupled to the display controller 109. It should be understood that the structural block diagram as shown in FIG. 1 is only for exemplary purposes and is not intended to state or imply any limitation to the present invention. In some cases, some devices may be added to or removed from this exemplary computer system 100 based on specific situations.

In database applications, data are usually present in a plurality of correlated tables, and it is rare for data to be present only in one table. A dataset of a small application system would have dozens of tables, while a dataset of a large system may have thousands of tables. Hence, users and database applications often have to make data queries in a large dataset comprising multiple tables, i.e. using a multi-table correlated query. A multi-table correlated query generally uses the table joining technique, which is quite time-consuming. Generally speaking, only such a multi-table correlated query has the necessity of being executed with both minimum query response time and minimum query total time, while a query in a single table usually has a very quick response. If users or applications have the above requirements, it is only required to run the query with the minimum query total time.

Figure 2:
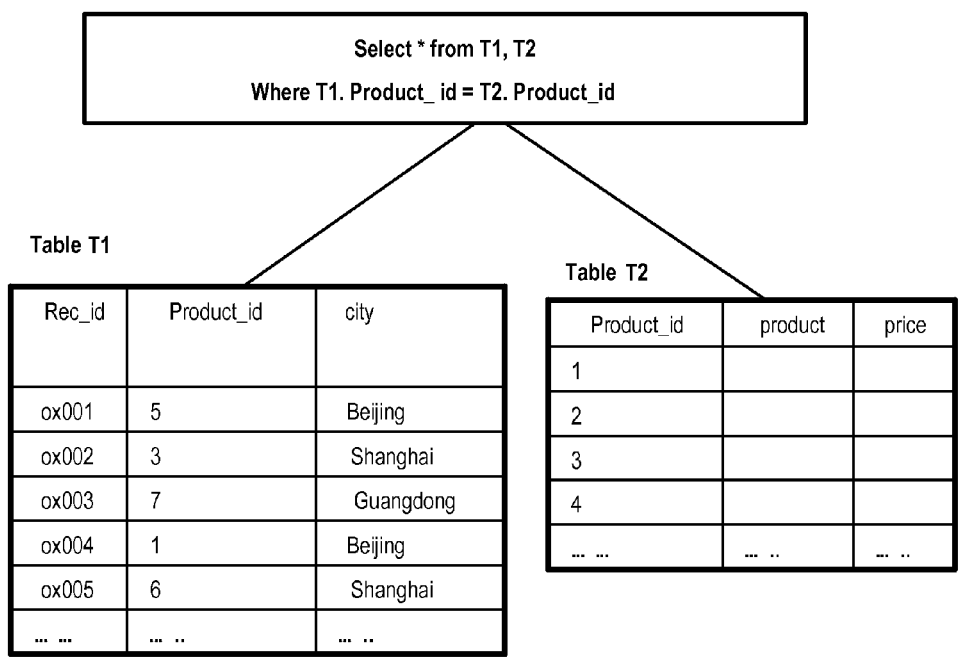
FIG. 2 shows an exemplary query request and its two corresponding tables.

Considering an example where the join operation of a query is performed on two tables in a database, a multi-table correlated operation may be regarded as a combination of several groups correlating the two tables. FIG. 2 shows an exemplary query request and its two corresponding tables. In the following description, a method of the present invention and its various implementations are explained with this example. The join operation of the query may also be an operation performed on a plurality of intermediate result sets of queries in the database or an operation performed on tables and intermediate query result sets. Hence, those skilled in the may appreciate that one or both of table T1 and table T2 may also be query result intermediate set(s). In FIG. 2, there are two tables whose common column is Product_id, and a query statement reads Select * from T1, T2 where T1.Product_id=T2.Product_id.

The table join technique used by multi-table correlated query includes nested loop join, hash join and sort merge join. The nested loop join works in the following mode: first, selecting a table as a driving table of join, e.g., table T1 in FIG. 2; then extracting eligible records from driving table T1; and finally performing a correlated query on a join column in a driven table, e.g., table T2 in FIG. 2, to obtain eligible records. During this process, the first eligible record is first extracted from driving table T1, then a correlated query is performed on the join column in driven table T2, thereby obtaining corresponding record row. In the process of the correlated query, other records conforming to the condition are continuously extracted from driving table T1 and subjected to the correlated query with driven table T2. Instead of waiting for the entire flow to end and returning a result set, result sets obtained from the query are continuously returned. In this case, an end user will obtain the first batch of returned records soon. Hence, the nested loop join returns first several records very quickly. The nested loop join is suitable for queries that have strong selectivity, high constraints and require returning of a result set of only a small part of records.

Figure 3:
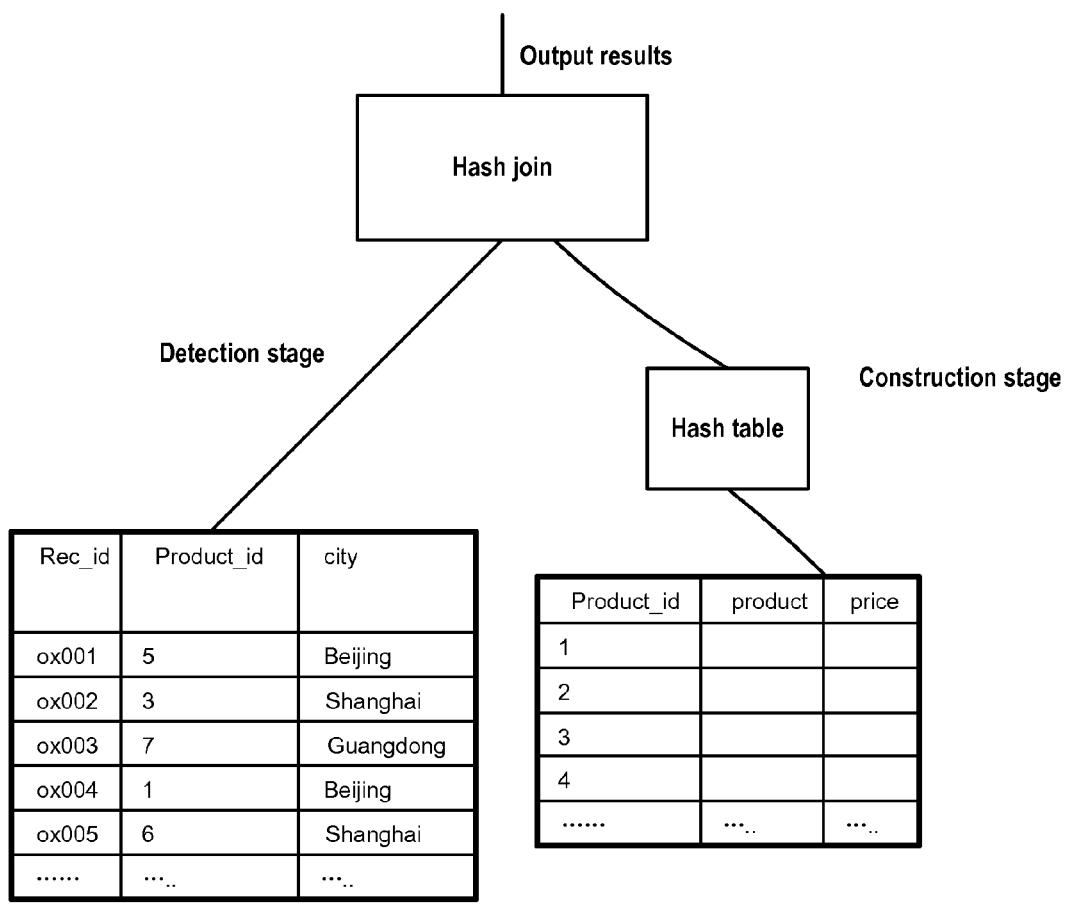
FIG. 3 shows an operation mode of a hash join.

FIG. 3 shows an operation mode of the hash join. According to this figure, the operation mode of the hash join is divided into two stages: first, in a construction stage, the query engine optimizer first selects a table, e.g., table T2 in FIG. 3, and applies a hash function on the join column in table T2 (i.e. column Product_id in table T2) to generate a hash table through calculations. Next, in a detection stage, the query engine optimizer applies the same hash function on the join column (i.e., column Product_id in table T1) of each record in the other table (e.g., table T1 in FIG. 2) to obtain a hash value through calculation and looking up a matching hash value in the generated hash table. For table T2 with a larger data amount, the construction stage of the hash join consumes longer time in initializing the hash table. In a distributed database environment, however, if data need to be extracted remotely, the construction time will be extended further. Therefore, the hash join has a longer query response time. On the other hand, once creation of the hash table is completed, all query result sets can be obtained quickly. Therefore, the hash join is more suitable for queries that require less query total time to return a large amount of result set data.

The sort merge join is relatively simple. Just like the hash join, the sort merge join works in a mode that is divided into two stages. First, in a construction stage, the query engine optimizer first sorts a larger one of the two tables according to the join column, i.e. sorting according to column Product_id in table T2 in FIG. 2, which sorting consumes a relatively long time. Then, in a running stage, the query engine optimizer first sorts the other of the two tables, i.e. table T1 in FIG. 2, according to column Product_id as well. Since the table is smaller, the sorting time is shorter. The query engine optimizer merge joins the two sorted tables directly, and extracts records conforming to the condition, thereby obtaining query results. Once the sorting is ended, all query results can be obtained rapidly. Therefore, compared with the nested loop join, the sort merge join is more suitable for queries that require less query total time to return results with a large data amount.

In the prior art, for a join query with a large data set, the query engine optimizer of the database management system usually selects the hash join or the sort merge join in order to obtain a better query total time. If it is mandatory that the query engine optimizer of the database management system obtain a better query response time, the query engine optimizer will select the nested loop join.

These three join modes are compared below in table 1. As seen from table 1, different join types have distinct advantages and join types may be divided into two main classes: joins with minimum query total time, and joins with minimum query response time. Accordingly, the query engine optimizer may output query plans that have minimum query total time and are established by joins with minimum query total time, and query plans that have minimum query total time and are established by joins with minimum query response time.

TABLE 1

Comparison of Three Join Modes

| Join Type | Advantage | For Large Data Set |
|---|---|---|
| sort merge join | less query total time | fast |
| hash join | less query total time | fast |
| nested loop join | less query response time | slow |

In view of the above analysis, the present invention proposes a novel method of database query, which method can ensure both minimum query total time and minimum query response time.

FIG. 4 shows steps of the novel method of database query according to one illustrative embodiment of the present invention. According to FIG. 4, in step S401, in response to a query request, a query plan intended for minimum query response time and a query plan intended for minimum query total time are obtained for the query request. In step S402, the query plan intended for minimum query response time and the query plan intended for minimum query total time start to be executed. In step S403, an initial query result obtained from the execution of the query plan intended for minimum query response time is outputted before the execution of the query plan intended for minimum query total time reaches a specified point. In step S404, in response to the execution of the query plan intended for minimum query total time reaching the specified point, the execution of the query plan intended for minimum query response time is continued in order to output remaining query results.

In the method as shown in FIG. 4, such a correlated query might come from, for example, a user, an application, or even a query request inside a database, i.e., a united query performed on intermediate query results inside a database query engine so as to accomplish a complex query request. Therefore, a join operation corresponding to such a query may be performed on two tables in a database, two intermediate query result sets, or a table and an intermediate query result set.

In one illustrative embodiment, in response to the execution of the query plan intended for minimum query total time reaching the specified point, the execution of the query plan intended for minimum query response time may be suspended so as to save CPU time, or the execution of the query plan intended for minimum query response time might not be suspended, while its subsequent query results are not adopted.

In an embodiment, the query plan intended for minimum query response time is a query plan using the nested loop join, and the query plan intended for minimum query total time is a query plan using the hash join. In this embodiment, an initial query result may be provided quickly while the query plan using the nested loop join is being executed. Specifically, for the example shown in FIG. 2, if table T2 is relatively large, T1 may be selected as the driving table of the nested loop join meanwhile serving as the other table in the construction stage of the hash join. In this embodiment, for each record in table T1, the query plan using the nested loop join performs a correlated query with the join column in table T2 to obtain a corresponding record row, i.e., judging whether or not a record matches. If so, it indicates that the record is a record in an outputted result and may be outputted; if not, the record is skipped, and the query plan continues to judge whether or not the next record matches. In the meantime, the hash join applies a hash function to calculate a hash value of each data item in column Product_id in table T2 and thereby generates a hash table. Once the hash table is generated, it indicates that the construction stage of the hash join ends. Here, the specified point to be reached by the execution of the query plan intended for minimum query total time refers to a point where the construction stage of the hash join ends. For the point where the construction stage of the hash join ends, queries may be repeatedly performed inside the database query engine until the point is reached. Alternatively, an event mechanism may be used inside the hash join such that once the execution of a relevant program of the hash join reaches the point, the query engine is notified. Then, the query engine may suspend the execution of the query plan intended for minimum query response time. The execution of the hash join plan is continued, and remaining query results are outputted.

In one illustrative embodiment where the execution of the hash join plan is continued and remaining query results are output, the hash join is not performed on records in driving table T1 on which the nested loop join plan has been performed. Hence, the execution of the hash join is continued from the first record in table T1 which is not yet subjected to the nested loop join, i.e., performing the detection stage of the query plan using the hash join; applying the same hash function on the record to calculate a hash value of the join column of the record; matching the hash value with the hash table obtained from table T2. If there is a matching value, it indicates that the record is an outputted result and may be outputted; otherwise, the above process is continued to the next record in table T1.

In another illustrative embodiment, the query plan intended for minimum query response time is a query plan using the nested loop join, and the query plan intended for minimum query total time is a query plan using the sort merge join. In this embodiment, an initial query result may be provided quickly with the query plan using the nested loop join is being executed. Specifically, for the example shown in FIG. 2, if table T2 is relatively large, T1 may be selected as the driving table of the nested loop join. In this embodiment, for each record in table T1, the query plan using the nested loop join performs a correlated query with the join column in table T2 to obtain a corresponding record row, i.e., judging whether or not a record matches. If so, it indicates that the record is a record in an outputted result and may be outputted; if not, the record is skipped, and the query plan continues to judge whether or not the next record is matching. In the meantime, in the construction stage of the sort merge join, for the other table that is not a driving table, namely, table T2, it is sorted according to column Product_id to obtain a sorted table for the other table, which can be stored using a temporary table. Once the sorting of table T2 is completed, it indicates that the construction stage of the sort merge join ends. Here, the specified point to be reached by the execution of the query plan intended for minimum query total time refers to a point where the construction stage of the sort merge join ends. For the point where the construction stage of the sort merge join ends, queries may be performed repeatedly inside the database query engine until the point is reached. Alternatively, an event mechanism may be used inside the sort merge join such that once the point is reached, the query engine is notified. Then, the query engine may suspend the execution of the query plan intended for minimum query response time. The execution of the sort merge join plan is continued, and remaining query results are outputted.

In an embodiment where the execution of the sort merge join plan is continued and remaining query results are outputted, the sort merge join is not performed on records in driving table T1 on which the nested loop join plan has been performed. That is, for those records on which the nested loop join plan has been performed in the driving table of the query plan using the nested loop join, no operation of the execution stage of the query plan using the sort merge join is performed. In this manner, three steps are comprised: first, removing from the driving table records on which the query plan using the nested loop join has been performed; sorting the driving table according to the join column to obtain a sorted table of a remaining driving table; and then performing a merge join operation on the sorted table of the remaining driving table and the sorted table of the other table to obtain the remaining query results.

In another illustrative embodiment where the execution of the query plan intended for minimum query total time is continued and remaining query results are outputted, three steps are comprised as follows: first, storing the initial query result; second, storing all query results of the query plan intended for minimum query total time; and finally, removing the initial query result from the all query results to thereby obtain the remaining query results. The above embodiment may have many variations. For example, a temporary table may be used to store an initial query result obtained from the execution of the query plan intended for minimum query response time; when an execution result of the query plan intended for minimum query total time is obtained, another temporary table may be used to store the result. Then, the two tables are merged, and repetitive items are removed. In this way, the query results to be outputted ultimately are obtained. Alternatively, the results are compared with a temporary table, and data items of the temporary table which are contained in the temporary table are removed, so as to obtain the query results to be outputted. Further, during the execution of the query plan intended for minimum query total time, each time a query result of the execution of the query plan intended for minimum query total time is obtained, the result is compared with a data item in a temporary table. If the result and the data item are the same, then the data item is not outputted; otherwise the data item is outputted. Further, there are many equivalent embodiments. For example, the number of data items in a temporary table is obtained; each time a query result of the execution of the query plan intended for minimum query total time is obtained, it is compared with a data item in the temporary table; if they are the same, then the data item is not outputted, and a counter is used to count; otherwise the data item is outputted. When a count result of the counter is equal to the number of data items in the temporary table, no comparison is made any more, such that all subsequent query results are outputted directly. In this manner, the query total time is reduced further.

In another illustrative embodiment, the initial query result obtained from the execution of the query plan intended for minimum query response time may be stored in a memory or cache or other storage component rather than in a temporary table, and query results to be outputted ultimately are obtained using a method similar to the foregoing.

In a further illustrative embodiment, a cost-based model of the current database query engine optimizer may be used to evaluate a cost for joining these two tables or two intermediate query result sets or a table and an intermediate query result set, to judge whether the hash join or the sort merge join requires a smaller cost, so as to select a proper minimum total time query plan. This embodiment comprises the steps of: evaluating a hash join query plan and a sort merge join query plan for the query plan intended for minimum query total time, wherein the evaluation uses a cost model of the database query engine optimizer; and selecting one of the query plans that requires a smaller cost, as the query plan intended for minimum query total time. Here, the cost model calculates respective costs for multiple possible execution plans, and selects an execution plan with the minimum cost to execute SQL statements, according to current system resources, statistical information, index information of join tables, etc. Existing databases support this model, so the principles and usage of the model are not detailed here.

Figure 5:
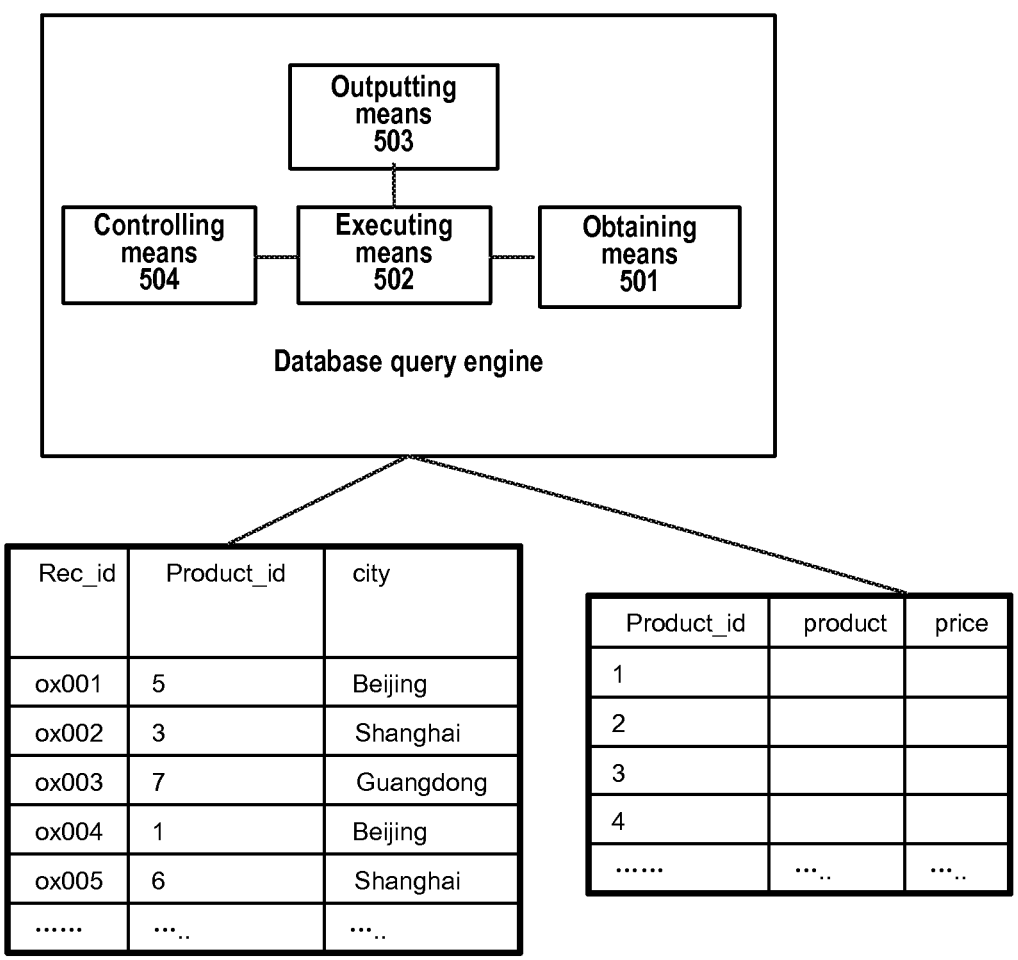
FIG. 5 shows a structural block diagram of a system for database query according to the present invention.

Under the same inventive concept, the present invention further discloses a system for database query. FIG. 5 shows a structure of one illustrative embodiment of the system. According to this figure, the system comprises: obtaining means 501 configured to obtain, in response to a query result, a query plan intended for minimum query response time and a query plan intended for minimum query total time of the query request; executing means 502 configured to execute the query plan intended for minimum query response time and the query plan intended for minimum query total time; controlling means 504 configured to detect whether the execution of the query plan intended for minimum query total time reaches a specified point; outputting means 503 configured to output query results; wherein before the controlling means detects that the execution of the query plan intended for minimum query total time reaches the specified point, the outputting means outputs an initial query result obtained from the execution of the query plan intended for minimum query response time; in response to the controlling means detecting that the execution of the query plan intended for minimum query total time reaches the specified point, the executing means continues the execution of the query plan intended for minimum query total time so that the outputting means outputs remaining query results. The system for database query as shown in FIG. 5 may be embedded in a current database query engine.

In one illustrative embodiment, the query plan intended for minimum query response time is a query plan using the nested loop join, and the query plan intended for minimum query total time is a query plan using the hash join. The specified point is a point where the construction stage of the hash join ends. The executing means continuing the execution of the query plan intended for minimum query total time comprises: the executing means performing operations of the detection stage of the query plan using the hash join, from the first record in a driving table of the query plan using the nested loop join on which the nested loop join query plan has not been performed.

In another illustrative embodiment, the query plan intended for minimum query response time is a query plan using the nested loop join, and the query plan intended for minimum query total time is a query plan using the sort merge join. The specified point is a point where the construction stage of the sort merge join ends. The executing means continuing the execution of the query plan intended for minimum query total time comprises: the executing means performing no operation of the execution stage of the query plan using the sort merge join on the records already subjected to the nested loop join query plan in a driving table of the query plan using the nested loop join query plan. In a more specific embodiment, the executing means comprises: removing means configured to sort the driving table according to a join column after removing the records already subjected to the nested loop join query plan, to obtain a sorted table of the remaining driving table; and merge joining means configured to perform a merge join operation on the sorted table of the remaining driving table and a sorted table of the other table to obtain the remaining query results.

In a further illustrative embodiment, the executing means further comprises: initial query result storing means configured to store the initial query result; all query results storing means configured to store all query results of the query plan intended for minimum query total time; and remaining query results obtaining means configured to remove the initial query result from the all query results to obtain the remaining query results.

In the system of one illustrative embodiment of the present invention, the query request is made with respect to at least one of: a plurality of tables, a plurality of intermediate query result sets, or a table and an intermediate query result set.

In a still further illustrative embodiment, the system further comprises (not shown in FIG. 5): evaluating means configured to evaluate a query plan using hash join and a query plan using sort merge join for the query plan intended for minimum query total time, wherein the evaluating means uses a cost model of the database query engine optimizer; and selecting means configured to select one of the two query plans that requires a smaller cost, as the query plan intended for minimum query total time.

The present invention can be implemented in software, hardware or combination of hardware components and hardware components. In a preferred embodiment, the present invention is implemented as software, including, without limitation to, firmware, resident software, micro-code, etc.

Moreover, the present invention may be implemented as a computer program product accessible by computer-usable or computer-readable media that provide program code for use by or in connection with a computer or any instruction executing system. For the purpose of description, a computer-usable or computer-readable medium may be any tangible means that can contain, store, communicate, propagate, or transport the program for use by or in connection with an instruction execution system, apparatus, or device.

The medium may be an electric, magnetic, optical, electromagnetic, infrared, or semiconductor system (apparatus or device), or propagation medium. Examples of the computer-readable medium would include the following: a semiconductor or solid storage device, a magnetic tape, a portable computer diskette, a random access memory (RAM), a read-only memory (ROM), a hard disk, and an optical disk. Examples of the current optical disk include a compact disk read-only memory (CD-ROM), compact disk-read/write (CD-R/W), and DVD.

A data processing system adapted for storing and/or executing program code would include at least one processor that is coupled to a memory element directly or via a system bus. The memory element may include a local memory usable during actually executing the program code, a mass memory, and a cache that provides temporary storage for at least one portion of program code so as to decrease the number of times for retrieving code from the mass memory during execution.

An Input/Output or I/O device (including, without limitation to, a keyboard, a display, a pointing device, etc.) may be coupled to the system directly or via an intermediate I/O controller.

A network adapter may also be coupled to the system such that the data processing system can be coupled to other data processing systems, remote printers or storage devices via an intermediate private or public network. A modem, a cable modem, and an Ethernet card are merely examples of a currently available network adapter.

It is to be understood from the foregoing description that modifications and alterations may be made to the respective embodiment of the present invention without departing from the real spirit of the present invention. The description in this specification is for purposes of illustration only, and should not be construed as limiting. The scope of the present invention is only defined by the appended claims.

What is claimed is:
1. A method of database query, comprising:
in response to a query request, obtaining a first query plan for minimum query response time and a second query plan for minimum query total time for the query request;
starting execution of the first query plan and execution of the second query plan at substantially a same time;
outputting, before execution of the second query plan reaches a specified point, an initial query result obtained from execution of the first query plan; and
in response to execution of the second query plan reaching the specified point, continuing execution of the second query plan to output remaining query results, wherein the first query plan is a query plan using a nested loop join operation, the second query plan is a query plan using a hash join operation and the specified point is a point where a construction stage of the hash join operation ends, wherein continuing execution of the second query plan comprises:
performing operation of a detection stage of the second query plan using the hash join operation, from a first record on which the nested loop join operation has not been performed in a driving table of the first query plan.
2. A method of database query, comprising:
in response to a query request, obtaining a first query plan for minimum query, response time and a second query plan for minimum query total time for the query request;
starting execution of the first query plan and execution of the second query plan at substantially a same time;
outputting, before execution of the second query plan reaches a specified point, an initial query result obtained from execution of the first query plan; and
in response to execution of the second query plan reaching the specified point, continuing execution of the second query plan to output remaining query results, wherein the first query plan is a query plan using a nested loop join operation, the second query plan is a query plan using a sort merge and the specified point is a point where a construction stage of the sort merge loin operation ends, wherein in the construction stage of the sort merge join operation, another table which is not a driving table of the first query plan is sorted according to a join column to obtain a sorted table of the another table, and wherein continuing execution of the second query plan comprises:
performing no operation of an execution stage of the second query plan using the sort merge join on records already subjected to the nested loop join operation of the first query plan in the driving table of the first query plan.
3. The method according to claim 2, wherein the performing no operation of an execution stage of the second query plan using the sort merge join on records already subjected to the nested loop join operation of the first query plan in the driving table of the first query plan comprises:
sorting the driving table according to the join column after removing the records already subjected to the nested loop join operation of the first query plan, to obtain a sorted table of a remaining driving table; and performing a merge join operation on the sorted table of the remaining driving table and the sorted table of the other table to obtain the remaining query results.

4. The method according to claim 1, wherein continuing execution of the second query plan to output remaining query results comprises:
   storing the initial query result;
   storing all query results of the second query plan; and
   removing the initial query result from the all query results to obtain the remaining query results.

5. The method according to claim 1, wherein the query request is made for at least one of:
   a plurality of tables;
   a plurality of intermediate query result sets; and
   a table and an intermediate query result set in the database.

6. The method according to claim 1, before obtaining a first query plan and a second query plan for the query request, further comprising:
   evaluating a hash join query plan that uses a hash join operation and a sort merge join query plan that uses a sort merge join operation for the second query plan based on a cost model in a database query engine optimizer; and
   selecting one of the hash join query plan or the sort merge join query plan which requires a smaller cost, as the second query plan.

7. A system for database query, comprising:
   obtaining means configured to obtain, in response to a query request, a first query plan for minimum query response time and a second query plan for minimum query total time for the query request;
   executing means configured to execute the first query plan and the second query plan at substantially a same time;
   controlling means configured to detect whether execution of the second query plan reaches a specified point; and
   outputting means configured to output query results;
   wherein before the controlling means detects that the execution of the second query plan reaches the specified point, the outputting means outputs an initial query result obtained from the execution of the first query plan, and wherein in response to the controlling means detecting that the execution of the second query plan reaches the specified point, the executing means continues the execution of the second query plan to cause the outputting means to output remaining query results, wherein the first query plan is a query plan using a nested loop join operation, the second query plan is a query plan using a hash join operation and the specified point is a point where a construction stage of the hash join operation ends, wherein the executing means continuing the execution of the second query plan comprises:
   the executing means performing operations of a detection stage of the second query plan using the hash join operation, from a first record on which the nested loop join operation has not been performed in a driving table of the first query plan.

8. A system for database query, comprising:
   obtaining means configured to obtain, in response to a query request, a first query plan for minimum query response time and a second query plan for minimum query total time for the query request,
   executing means configured to execute the first query plan and the second query plan at substantially a same time;
   controlling means configured to detect whether execution of the second query plan reaches a specified point; and
   outputting means configured to output query results;
   wherein before the controlling means detects that the execution of the second query plan reaches the specified point, the outputting means outputs an initial query result obtained from the execution of the first query plan, and wherein in response to the controlling means detecting that the execution of the second query plan reaches the specified point, the executing means continues the execution of the second query plan to cause the outputting means to output remaining query results, wherein the first query plan is a query plan using a nested loop join operation, the second query plan is a query plan using a sort merge join operation and the specified point is a point where a construction stage of the sort merge join operation ends, wherein in the construction stage of the sort merge join operation, another table which is not a driving table of the first query plan is sorted according to a join column to obtain a sorted table of the another table, and wherein the executing means continuing the execution of the second query plan comprises:
   the executing means performing no operation of an execution stage of the second query plan using the sort merge join on records already subjected to the nested loop join operation of the first query plan in the driving table of the first query plan.

9. The system according to claim 8, wherein the executing means comprises:
   removing means configured to sort the driving table according to the join column after removing records already subjected to the nested loop join operation of the first query plan, to obtain a sorted table of a remaining driving table; and
   merging-joining means configured to perform a merge-join operation on the sorted table of the remaining driving table and the sorted table of the other table to obtain the remaining query results.

10. The system according to claim 7, wherein the executing means further comprises:
    initial query result storing means configured to store the initial query result;
    all query results storing means configured to store all query results of the second query plan; and
    remaining query result removing means configured to remove the initial query result from the all query results to obtain the remaining query results.

11. The system according to claim 7, wherein the query request is made for at least one of:
    a plurality of tables;
    a plurality of intermediate query result sets; and
    a table and an intermediate query result set in the database.

12. The system according to claim 7, further comprising:
    evaluating means configured to evaluate a hash join query plan that uses a hash join operation and a sort merge join query plan that uses a sort merge join operation for the second query plan based on a cost model in a database query engine optimizer; and
    selecting means configured to select one of the hash join query plan or the sort merge join query plan which requires a smaller cost, as the second query plan.

13. A computer program product comprising a non-transitory computer readable medium having a computer readable program stored therein, wherein the computer readable program, when executed on a computing device, causes the computing device to:
    in response to a query request, obtain a first query plan for minimum query response time and a second query plan for minimum query total time for the query request;

start execution of the first query plan and execution of the second query plan at substantially a same time;

output, before execution of the second query plan reaches a specified point, an initial query result obtained from execution of the first query plan; and in response to execution of the second query plan reaching the specified point, continue execution of the second query plan to output remaining query results, wherein the first query plan is a query plan using a nested loop join operation, the second query plan is a query plan using a hash join operation and the specified point is a point where a construction stage of the hash join operation ends, wherein continuing execution of the second query plan comprises:

performing operation of a detection stage of the second query plan using the hash join operation, from a first record on which the nested loop join operation has not been performed in a driving table of the first query plan.

14. An apparatus, comprising:

a processor; and a memory coupled to the processor, wherein the memory comprises instructions which, when executed by the processor, cause the processor to:

obtain, in response to a query request, a first query plan for minimum query response time and a second query plan for minimum query total time for the query request;

start execution of the first query plan and execution of the second query plan at substantially a same time;

output, before execution of the second query plan reaches a specified point, an initial query result obtained from execution of the first query plan; and continue, in response to execution of the second query plan reaching the specified point, execution of the second query plan to output remaining query results, wherein the first query plan is a query plan using a nested loop join operation, the second query plan is a query plan using a hash join operation and the specified point is a point where a construction stage of the hash join operation ends, wherein continuing execution of the second query plan comprises:

performing operation of a detection stage of the second query plan using the hash join operation, from a first record on which the nested loop join operation has not been performed in a driving table of the first query plan.

15. The method according to claim 2, wherein continuing execution of the second query plan to output remaining query results comprises:

storing the initial query result;

storing all query results of the second query plan; and removing the initial query result from the all query results to obtain the remaining query results.

16. The method according to claim 2, wherein the query request is made for at least one of:

a plurality of tables;

a plurality of intermediate query result sets; and a table and an intermediate query result set in the database.

17. The method according to claim 2, before obtaining a first query plan and a second query plan for the query request, further comprising:

evaluating a hash join query plan that uses a hash join operation and a sort merge join query plan that uses a sort merge join operation for the second query plan based on a cost model in a database query engine optimizer; and selecting one of the hash join query plan or the sort merge join query plan which requires a smaller cost, as the second query plan.

18. The system according to claim 8, wherein the executing means further comprises:

initial query result storing means configured to store the initial query result;

all query results storing means configured to store all query results of the second query plan; and remaining query result removing means configured to remove the initial query result from the all query results to obtain the remaining query results.

19. The system according to claim 8, wherein the query request is made for at least one of:

a plurality of tables;

a plurality of intermediate query result sets; and a table and an intermediate query result set in the database.

20. The system according to claim 8, further comprising:

evaluating means configured to evaluate a hash join query plan that uses a hash join operation and a sort merge join query plan that uses a sort merge join operation for the second query plan based on a cost model in a database query engine optimizer; and selecting means configured to select one of the hash join query plan or the sort merge join query plan which requires a smaller cost, as the second query plan.

* * * * *